Patented Jan. 27, 1942

2,271,468

UNITED STATES PATENT OFFICE 2,271,468

WATER SOLUBLE POLYVINYL ALCOHOL SOFTENED WITH BETA-HYDROXY-ALKYL AMMONIUM SALT

William W. Watkins, Buffalo, N. Y., assignor to E. I. du Pont de Nemours & Company, Wilmington, Del., a corporation of Delaware No Drawing. Application January 18, 1941, Serial No. 375,024

12 Claims. (Cl. 260—36)

This invention relates to new polyvinyl alcohol compositions and articles formed therefrom. More particularly, it relates to polyvinyl alcohol modified with certain alkylol amine acid addition products as softeners therefor.

Recently there has been developed a water soluble product called polyvinyl alcohol, which is characterized by several unique properties, for example, extreme toughness, great flexibility, outstanding transparency and very high elongation. The present disclosure represents the outgrowth of an extensive research program designed to place polyvinyl alcohol (which per se is not suitable for such a use) in the sheet wrapping material and related fields.

It is therefore an object of this invention to prepare modified polyvinyl alcohol compositions. It is a further object to discover softeners, particularly softeners which are not too volatile, for polyvinyl alcohol. It is a still further object to produce films, threads and the like, of polyvinyl alcohol which are very much tougher than polyvinyl alcohol films, threads or the like, hitherto known. Still another object is to produce a polyvinyl alcohol film which is not of too low softness, especially at low humidities. A general advance in the art, and other objects which will appear hereinafter, are also contemplated.

These objects are accomplished in general by means of a composition comprising polyvinyl alcohol and a water soluble nitrogen-containing alcohol nitrogen salt of the general formula:

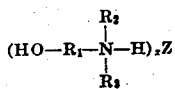

in which $R_1$ is a di-valent aliphatic hydrocarbon radical (residue, nucleus, group) containing not more than 4 carbon atoms (such as $-CH_2CH_2-$); $R_2$ and $R_3$ are hydrogen or aliphatic hydrocarbon radicals, the sum of whose carbon atoms does not exceed 6; Z is an acid residue such as $-OCOCH_3$, $-OCOCH_2CH_2COO-$, $-Cl$, $=SO_4$, $=CO_3$, $\equiv PO_4$ or the like, and $x$ is the valence of the acid residue whether it be an organic ester group or an inorganic salt anion.

From the following description, in which are disclosed certain embodiments of the invention as well as details as to what is believed to be the best mode for carrying out the invention, it will be apparent how the foregoing objects and related ends are accomplished. The quantities are given in parts by weight throughout the application unless otherwise specified.

Example I

To 100 parts of aqueous 15% polyvinyl alcohol solution there was added 1.7 parts of beta-hydroxy-ethylammonium sulfamate. After thorough mixing, this composition was perfectly clear. When cast on to a metal plate it dried to a clear, soft, transparent film, which maintained its softness even at low humidities.

Example II

To 100 parts of aqueous 13% polyvinyl alcohol solution there was added 4.9 parts of beta-hydroxy-ethylammonium lactate. The mixture was stirred until a clear, homogeneous solution resulted. Films cast from this solution were found to be clear and transparent, and evidenced a high degree of softness at low humidities.

Example III

To 100 grams of 13% polyvinyl alcohol solution are added 2.3 grams of beta-hydroxy-ethylammonium chloride (sometimes called "ethanolamine hydrochloride"). The mixture is stirred until a clear, homogeneous solution results. Films cast from this solution are clear and soft, even at low humidities.

Example IV

To 350 grams of 15% polyvinyl alcohol solution, 10.5 grams of beta-hydroxy-ethylammonium acetate (frequently called "ethanolamine acetate") were added. The solution was stirred until homogeneous, and was then cast into thin films on a metal plate. The films were conditioned for 48 hours at 85° F. (29.44° C.) and 7% relative humidity.

Example V

To a solution containing 20% polyvinyl alcohol dissolved in water, was added 11% (based on the polyvinyl alcohol present) beta-hydroxy-ethylammonium formate. The film was cast from this solution on to a nickel surface, and dried thereon. The resulting film was clear, soft, transparent and maintained its softness even at low humidities.

Example VI

A film was prepared from a dope consisting of 19% polyvinyl alcohol (hydroxyl 95%, acetyl 5%) and 81% water. Into this dope there was uniformly incorporated 38% (based on the polyvinyl alcohol present) beta-hydroxy-ethylammonium adipate and 2.5% (based on the polyvinyl alcohol plus softener content of the dope) sodium oleate. The resulting material was cast on a stainless steel casting wheel and all but 5% of the water evaporated. The films, which stripped easily from the casting wheel, were found to be clear, transparent and possessed a high degree of softness which they retained even at low humidities.

Example VII

A dope was prepared consisting of 15.8% of polyvinyl alcohol (hydroxyl approximately 100%)

and 84.2% of water. To this dope there was added 18% (based on the polyvinyl alcohol present) beta-hydroxy-ethylammonium acetate. A thin layer of the resulting dope, after it had been homogenized and freed from bubbles, was cast on to a nickel casting belt and the water evaporated. A glass-clear, transparent film 0.001 inch thick, especially suitable for the purposes set out in U. S. A. patent application Serial No. 122,422 of January 26, 1937, resulted.

Example VIII

Six hundred (600) parts of potassium hydroxide was dissolved in 500 parts of ethyl alcohol in a vessel equipped with a stirrer. To this solution was added, with thorough agitation, 800 parts of ground polymerized vinyl acetate prepared by polymerizing vinyl acetate with the aid of benzoyl peroxide. After agitating for about one-half hour, the polyvinyl acetate saponified and polyvinyl alcohol precipitated. The precipitate was separated on a filter, washed with ethyl alcohol and dried. Two thousand (2,000) parts of polyvinyl alcohol, prepared in this manner, and 13 parts of ammonium palmitate, were added to a composition consisting of 8,000 parts of water and 260 parts of beta-hydroxy-ethylammonium lactate. The mixture was heated to a temperature of 90°–97° C., and while at that temperature it was thoroughly agitated for a period of 3 hours. The solution was filtered and delivered by means of a metering pump to a casting hopper maintained at a suitable temperature.

The solution was converted into a film by flowing the dope on to the polished nickel surface of a rotating casting wheel 6 feet in diameter, maintained at 85°–90° C. As the casting wheel revolved, the layer of dope was smoothed to a uniform thickness by a doctor knife. With the continued turning of the wheel, the smooth uniform layer of casting composition emerged (passed) from the casting chamber into a drying chamber (which enclosed a portion of the casting wheel). Air passing through the drying chamber at a temperature of approximately 200° C. removed the solvent from the composition, so that after approximately four-fifths of a revolution of the wheel a film, which was fairly well set, was secured. The resulting film stripped without difficulty from the casting surface, and was wound into a mill roll for further processing. The film thus prepared was clear, transparent and soft, and retained its softness even at low humidities.

Example IX

A dope consisting of:

| | Per cent |
|---|---|
| Polyvinyl alcohol (Ex. VI type) | 10 |
| Polyvinyl alcohol (Ex. VII type) | 5 |
| Water | 85 | was prepared, and to the same there was added 7% (based on the polyvinyl alcohol present) beta-hydroxy-ethylammonium chloride. The resulting mixture, after homogenization, was cast continuously on the polished surface of a rotating nickel cylinder 6 feet in diameter. The water was evaporated, and the resulting film stripped from the surface of the casting wheel. The film, which had a thickness of 0.00088 inch, was very clear, could be satisfactorily sewed, and had excellent tear resistance.

Example X

A film was prepared from a dope consisting of 10% polyvinyl alcohol (hydroxyl 80%, acetyl 20%) and 90% water. Into this dope there was uniformly incorporated 25% (based on the polyvinyl alcohol present) beta-hydroxy-ethylammonium succinate. The resulting material was cast on to a stainless steel casting belt, and the water evaporated. A glass-clear, transparent film 0.0009 inch thick, which possessed a high degree of softness even at low humidities, resulted.

Example XI

A film was prepared from a dope consisting of 30% polyvinyl alcohol (hydroxyl 90%, acetyl 10%) and 70% water. Into this dope there was uniformly incorporated 5% (based on the polyvinyl alcohol present) beta-hydroxy-ethylammonium citrate. The resulting material was cast on to a stainless steel casting belt, and the water evaporated. A glass-clear, transparent film 0.0009 inch thick, which possessed a high degree of softness even at low humidities, resulted.

The preferred beta-hydroxy-ethylammonium salts derived from mono-ethanolamine are beta-hydroxy-ethylammonium formate, beta-hydroxy-ethylammonium acetate, beta-hydroxy-ethylammonium propionate, beta-hydroxy-ethylammonium butyrate, beta-hydroxy-ethylammonium isobutyrate, beta-hydroxy-ethylammonium oxalate, beta-hydroxy-ethylammonium malonate, beta-hydroxy-ethylammonium succinate, beta-hydroxy-ethylammonium glutarate, beta-hydroxy-ethylammonium adipate, beta-hydroxy-ethylammonium lactate, beta-hydroxy-ethylammonium glycolate (hydroxy acetate), beta-hydroxy-ethylammonium tartrate, beta-hydroxy-ethylammonium malate, beta-hydroxy-ethylammonium citrate, and beta-hydroxy-ethylammonium sulfamate. The propanolamine derivatives, such as beta-hydroxy-propylammonium formate, beta-hydroxy-propylammonium acetate, gamma-hydroxy-propylammonium acetate, and beta-hydroxy-propylammonium propionate, and the butanol-amine (including 2:3-butylene, 1:2-butylene and isobutylene links, preferably with the hydroxyl in the beta position) derivatives, may also be used satisfactorily. The chlorides, phosphates, sulfates and carbonates are the preferred alkylol amine salts when the acid radical is inorganic. The compounds (softeners) used, of course, should be compatible with the polyvinyl alcohol. This requirement is met by the compounds enumerated above, which are covered by the general formula $(HO-alkylene-NH_3)_xZ$ wherein Z represents the acid radical which should not contain more than 6 carbon atoms; and $x$ is a number equal to the valence of the acid radical. When Z contains carboxyl groups separated by carbon atoms, the carbon atoms may be substituted with hydrogen or hydroxyl radicals.

The polyvinyl alcohol may be produced by the methods known to the art, for example, by saponifying polymeric vinyl acetate with a 1% solution of hydrochloric acid in ethanol. At least 80% of the acetate radicals must be converted to hydroxyl groups to give satisfactory water solubility. If more acetate radicals are removed, other groups may be substituted provided sufficient hydroxyl groups to give water solubility are present. A practically completely saponified product can be reacted with an aldehyde (formaldehyde, acetaldehyde, propionaldehyde, butyraldehyde, etc.) to produce an acetal of up to 8% substitution without loss of water solubility.

The vinyl acetate polymer may be prepared, for example, by polymerizing monomeric vinyl acetate by means of 0.5% sodium perborate and 5% acetic anhydride.

The polyvinyl alcohol utilized according to this invention may be of any desired viscosity, for example, 15 to 75 centipoises, but preferably having a viscosity of approximately 18 to 40 centipoises in 4% solution at 20° C.

The polyvinyl alcohol employed as a base in the present invention is preferably in concentrations of between 10% and 30% of the solution when it is to be cast into films.

The softener can be incorporated in the polyvinyl alcohol in any desired fashion, either before or after forming into a shaped article. In cases where the polyvinyl alcohol is coagulated by the dry or evaporative method, the softener is preferably incorporated prior to forming into a shaped article, while when coagulated by contacting with a liquid coagulating bath, the softener is preferably incorporated after formation into a shaped article.

The amount of softener included in the composition can vary within quite wide limits, provided there is sufficient to produce a softening effect and not so much that the product formed therefrom becomes sticky. Concentrations of between 5% and 25% (based on the amount of polyvinyl alcohol present) have been found most suitable. Because the compounds vary in their softening effect, the most suitable concentration varies, in a minor manner, in the case of each softener used.

Dopes or polyvinyl alcohol evaporative solutions may contain strip agents to facilitate stripping from the casting wheels or belts, especially when the stripping takes place while there is still a small amount of solvent, for example, up to or within the range 5% to 15% present. Usually 0.5% to 5% (based on the weight of the polyvinyl alcohol plus softener and any other so-called "solids" which may be present) of the strip agent is satisfactory.

The invention is not limited to the polyvinyl alcohols of the specific examples, although it peculiarly appertains thereto. Products having a molecular weight in the range 15,000 to 19,000 appear to make the best sheet wrapping and protective covering material.

Polyvinyl alcohol compositions in accordance with this invention may be made up into films, tubes, bottle caps, threads, or other shaped articles. They are most useful in the formation of transparent films suitable for wrapping tissue. They have particular utility as protective coverings during the handling, shipping and sewing of articles such as shoes, handbags, and the like. The leather (natural or imitation), fabric, cloth and related materials being fabricated are protected from marking (by dirt), spotting (by grease), scuffing (by improper handling), etc., by the covering of polyvinyl alcohol which is so tough that it can be sewed with 10, 20, or even 30 stitches per inch and still have sufficient tear resistance to remain in place during fabrication operations.

Films containing appropriate amounts of these softeners are perfectly clear and transparent, and are, under given conditions of temperature and humidity, substantially softer and more durable than films of unmodified polyvinyl alcohol or those softened with glycerol or glycol. For example, a film made according to Example IV, conditioned at 85° F. and 7% relative humidity, made up into a standard rice filled bag and tested in a standard durability tumbling test, averaged 529 drops per break. A bag made up as Example IV, but softened with a similar amount of glycerin, then conditioned and tested in exactly the same fashion as above, averaged 14 drops per break. The elongation is ordinarily at least twice as great as similar films softened with glycerin.

In the aforementioned durability test, a sample of the film to be tested is formed into a bag, and 200 grams of rice inserted therein. The bag is closed so as to leave the film tightly wrapping the rice, without loose flaps, and sealed by means of a piece of pressure-sensitive regenerated cellulose adhesive tape. The bag is then repeatedly dropped from a height of two feet onto a glass plate, in an atmosphere of 35% relative humidity. The number of times that it can be dropped without breaking is a direct measure of its toughness, and may be considered, for the purpose of this specification, as the toughness factor.

This specification contains material taken from one of my co-pending applications filed November 17, 1937, now U. S. A. Patent No. 2,250,664, issued July 29, 1941.

As many apparently widely different embodiments of this invention may be made without departing from the spirit and scope thereof, it is to be understood that this invention is not limited to the specific embodiments thereof except as defined in the appended claims.

I claim:

1. A composition comprising polyvinyl alcohol and beta-hydroxy-ethylammonium chloride.

2. A composition comprising polyvinyl alcohol and beta-hydroxy-ethylammonium acetate.

3. A composition comprising water soluble polyvinyl alcohol and beta-hydroxy-ethylammonium chloride.

4. A transparent sheet comprising water soluble polyvinyl alcohol softened with 5% to 25% beta-hydroxy-ethylammonium chloride.

5. A transparent sheet comprising polyvinyl alcohol and beta-hydroxy-ethylammonium chloride.

6. A transparent sheet comprising polyvinyl alcohol and beta-hydroxy-ethylammonium acetate.

7. A transparent sheet comprising essentially polyvinyl alcohol softened with a beta-hydroxy-ethylammonium salt.

8. A transparent sheet comprising essentially polyvinyl alcohol softened with a beta-hydroxy-alkylammonium salt.

9. A composition comprising water soluble polyvinyl alcohol and beta-hydroxy-ethylammonium acetate.

10. A transparent sheet comprising water soluble polyvinyl alcohol softened with 5% to 25% beta-hydroxy-ethylammonium acetate.

11. A transparent sheet comprising essentially water soluble polyvinyl alcohol softened with 5% to 25% of beta-hydroxy-ethylammonium salt.

12. A transparent sheet comprising essentially water soluble polyvinyl alcohol softened with 5% to 25% of beta-hydroxy-alkylammonium salt.

WILLIAM W. WATKINS.